(12) United States Patent
Marras et al.

(10) Patent No.: US 12,340,488 B2
(45) Date of Patent: Jun. 24, 2025

(54) NOISE RECONSTRUCTION FOR IMAGE DENOISING

(71) Applicant: HUAWEI TECHNOLOGIES CO., LTD., Guangdong (CN)

(72) Inventors: Ioannis Marras, London (GB); Ioannis Alexiou, London (GB); Gregory Slabaugh, London (GB); Stefanos Zafeiriou, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 17/831,578

(22) Filed: Jun. 3, 2022

(65) Prior Publication Data

US 2022/0301114 A1 Sep. 22, 2022

Related U.S. Application Data

(63) Continuation of application No. PCT/EP2019/083713, filed on Dec. 4, 2019.

(51) Int. Cl.
  *G06T 5/70* (2024.01)
  *G06N 3/088* (2023.01)
  *G06T 5/50* (2006.01)

(52) U.S. Cl.
  CPC .............. *G06T 5/70* (2024.01); *G06N 3/088* (2013.01); *G06T 5/50* (2013.01);
  (Continued)

(58) Field of Classification Search
  CPC . G06T 2207/20081; G06T 2207/20084; G06T 5/60; G06T 2207/20224;
  (Continued)

(56) References Cited

U.S. PATENT DOCUMENTS

| 8,160,293 B1 | 4/2012 | Fridrich et al. |
| 2016/0171727 A1* | 6/2016 | Bouchard ................. G06T 5/60 |
| | | 382/131 |

(Continued)

FOREIGN PATENT DOCUMENTS

| CN | 101739671 A | 6/2010 |
| CN | 107516304 A * | 12/2017 |

(Continued)

OTHER PUBLICATIONS

Marras, I., Chrysos, G. G., Alexiou, I., Slabaugh, G., & Zafeiriou, S. (2020). Reconstructing the noise manifold for image denoising. arXiv preprint arXiv:2002.04147. (Year: 2020).*

(Continued)

*Primary Examiner* — Chineyere Wills-Burns
*Assistant Examiner* — Emmanuel Silva-Avina
(74) *Attorney, Agent, or Firm* — Fish & Richardson P.C.

(57) ABSTRACT

The present disclosure provides example apparatuses, methods, and devices for denoising an image. One example apparatus performs operations including receiving an input image. A trained artificial intelligence model is implemented to form an estimate of a noise pattern in the input image and form an output image by subtracting the estimate of the noise pattern from the input image, where the model is configured to form the estimate of the noise pattern, and the estimate of the noise pattern is representative of a noise pattern that is characteristic to a specific image sensor type.

14 Claims, 9 Drawing Sheets

(52) U.S. Cl.
CPC ............... *G06T 2207/20081* (2013.01); *G06T 2207/20084* (2013.01); *G06T 2207/20224* (2013.01)

(58) Field of Classification Search
CPC .... G06T 5/50; G06T 5/70; G06T 7/80; G06N 3/088; G06N 3/084; G06N 3/082
USPC ......................................................... 382/100
See application file for complete search history.

(56) References Cited

U.S. PATENT DOCUMENTS

| | | | |
|---|---|---|---|
| 2017/0163918 A1 | 6/2017 | Chen et al. | |
| 2020/0065940 A1* | 2/2020 | Tang | G06T 3/40 |
| 2020/0311878 A1* | 10/2020 | Matsuura | G06F 18/2115 |

FOREIGN PATENT DOCUMENTS

| | | | | |
|---|---|---|---|---|
| CN | 105164725 B | | 3/2019 | |
| CN | 109978778 A | | 7/2019 | |
| CN | 110390646 A | * | 10/2019 | |
| CN | 110197183 B | * | 10/2022 | ............... G06K 9/40 |
| CN | 109685743 B | * | 1/2023 | ............... G06T 5/002 |

OTHER PUBLICATIONS

Zhang et al., "Beyond a Gaussian Denoiser: Residual Learning of Deep CNN for Image Denoising," IEEE Transactions on Image Processing, arXiv:1608.03981v1, Aug. 13, 2016, 14 pages.
He et al., "Deep Residual Learning for Image Recognition" Proceedings of the IEEE Conference on Computer Vision and Pattern Recognition, arXiv:1512.03385v1, Dec. 10, 2015, 12 pages.
International Search Report and Written Opinion in International Appln. No. PCT/EP2019/083713, mailed on Oct. 12, 2020, 21 pages.
Ronneberger et al., "U-Net: Convolutional Networks for Biomedical Image Segmentation," Medical Image Computing and Computer-Assisted Intervention (MICCAI), arXiv: 1505.04597v1, May 18, 2015, 8 pages.
Yu et al., "Path-Restore: Learning Network Path Selection for Image Restoration," IEEE Transactions on Pattern Analysis and Machine Intelligence, arXiv:1904.10343v2, Jul. 27, 2021, 15 pages.
Zhang et al., "Beyond a Gaussian Denoiser: Residual Learning of Deep CNN for Image Denoising," IEEE Transactions on Image Processing, vol. 26, No. 7, Jul. 2017, 14 pages.
Anaya et al., "Renoir—A Dataset for Real Low-Light Noise Image Reduction," Journal of Visual Communication and Image Representation 51, Sep. 29, 2014, 11 pages.
Plotz et al., "Benchmarking Denoising Algorithms with Real Photographs," Proceedings of the IEEE Conference on Computer Vision and Pattern Recognition, arXiv:1707.01313v1, Jul. 5, 2017, 19 pages.
Abdelhamed et al., "NTIRE 2019 Challenge on Real Image Denoising: Methods and Results," 2019 IEEE/CVF Conference on Computer Vision and Pattern Recognition Workshops, Jun. 2019, 14 pages.
Gu et al., "A Brief Review of Image Denoising Algorithms and Beyond" Inpainting and Denoising Challenges, Oct. 17, 2019, 151 pages.
Toffe et al., "Batch Normalization: Accelerating Deep Network Training by Reducing Internal Covariate Shift," arXiv:1502.03167v3, Mar. 2, 2015, 11 pages.
Gu et al., "Weighted Nuclear Norm Minimization with Application to Image Denoising," 27th IEEE Conference on Computer Vision and Pattern Recognition, Sep. 2014, 8 pages.
Tai et al., "Memnet: A Persistent Memory Network for Image Resoration," Proceedings of the IEEE International Conference on Computer Vision, arXiv:1708.02209v1, Oct. 2017, 9 pages.
Rudin et al., "Nonlinear Total Variation Based Noise Removal Algorithms," Physica D: Nonlinear Phenomena, vol. 60, Issues 1-4, Nov. 1, 1992, 11 pages.
Mairal et al., "Non-Local Sparse Models for Image Restoration," 2009 IEEE 12th International Conference on Computer Vision, Sep. 2009, 8 pages.
Roth et al., "Fields of Experts," International Journal of Computer Vision, Jan. 24, 2009, 25 pages.
Chrysos et al., "Robust Conditional Generative Adversarial Networks," arXiv preprint, arXiv:1805.08657v2, Mar. 13, 2019, 27 pages.
Mirza et al., "Conditional Generative Adversarial Nets," arXiv preprint, arXiv:1411.1784, Nov. 6, 2014, 7 pages.
Abdelhamed et al., "Noise Flow: Noise Modeling with Conditional Normalizing Flows," arXiv:1908.08453v1, Aug. 22, 2019, 10 pages.
Chang et al., "One Network to Solve Them All—Solving Linear Inverse Problems using Deep Projection Models", 2017 IEEE International Conference on Computer Vision, arXiv:1703.09912 v1, Mar. 29, 2017, 10 pages.

\* cited by examiner

FIG. 1(a)
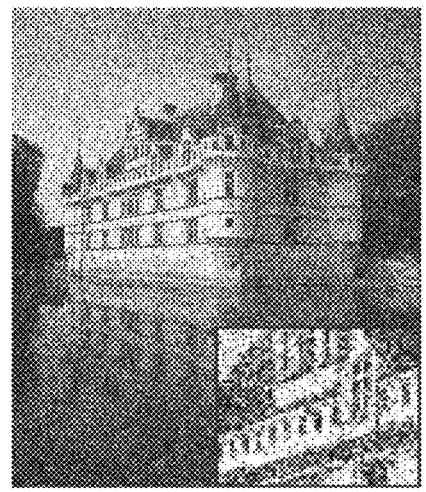
FIG. 1(b)
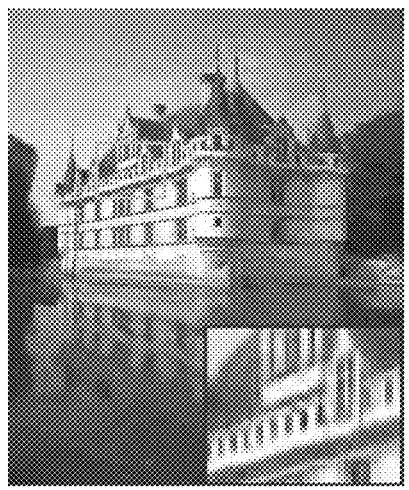
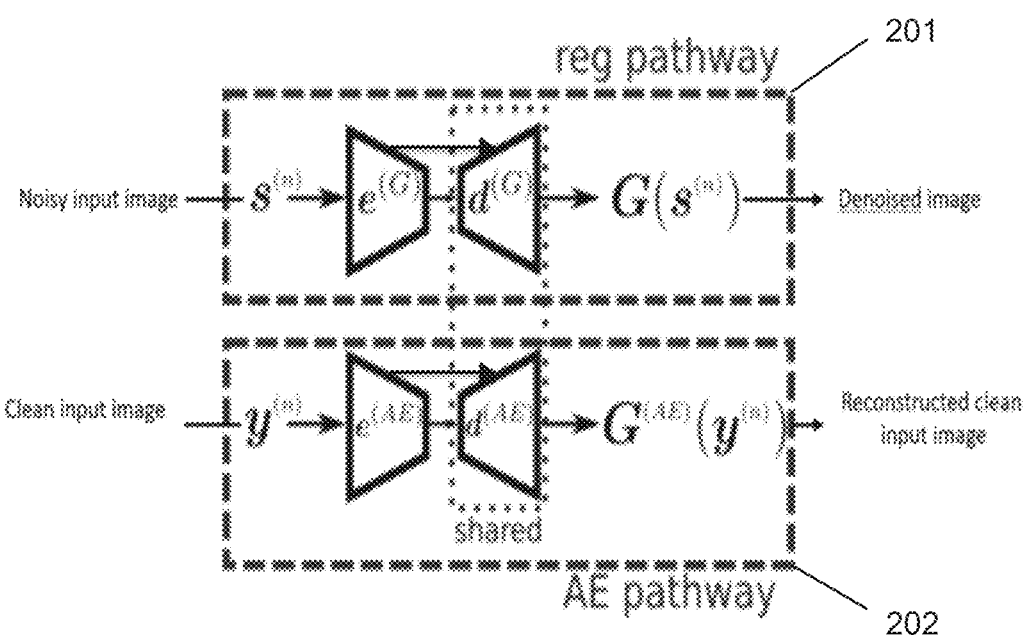
FIG. 2 (Prior Art)

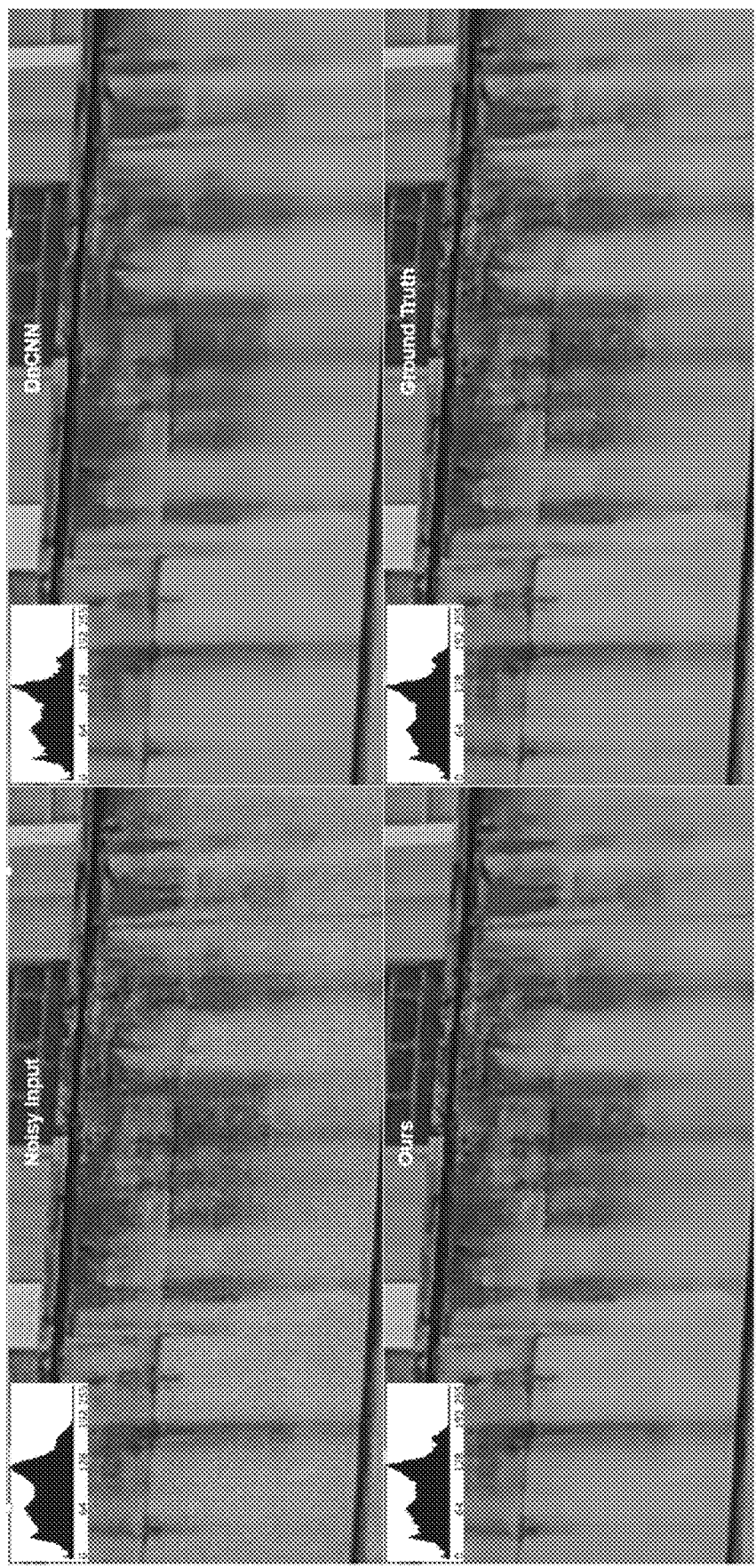

NOISE RECONSTRUCTION FOR IMAGE DENOISING

CROSS-REFERENCE TO RELATED APPLICATIONS

This application is a continuation of International Application No. PCT/EP2019/083713, filed on Dec. 4, 2019, the disclosure of which is hereby incorporated by reference in its entirety.

FIELD OF THE INVENTION

This invention relates to computer vision, and in particular using a deep neural network such as a convolutional neural network for image analysis.

BACKGROUND

Image denoising aims to estimate the underlying clean image from its noisy observation. Denoising is an important step in many digital imaging and computer vision systems. FIG. 1(a) shows how the presence of noise can affect image quality. FIG. 1(b) shows the improvement of the image quality achieved by applying an image denoising technique to the noisy image of FIG. 1(a) (from Kai Zhang, Wangmeng Zuo, Yunjin Chen, Deyu Meng, and Lei Zhang, "Beyond a Gaussian Denoiser: Residual Learning of Deep CNN for Image Denoising", IEEE Transactions on Image Processing, 2017).

Camera sensors output RAW data in a linear color space, where pixel measurements are proportional to the number of photoelectrons collected. The primary sources of noise are shot noise, a Poisson process with variance equal to the signal level, and read noise, an approximately Gaussian process caused by a variety of sensor readout effects. These effects are well-modelled by a signal-dependent Gaussian distribution:

$$x_p \sim \mathcal{N}(y_p, \sigma_r^2 + \sigma_s y_p) \quad (1)$$

where $x_p$ is a noisy measurement of the true intensity $y_p$ at pixel p. The noise parameters $\sigma_r$ and $\sigma_s$ are fixed for each image but can vary from image to image as sensor gain (ISO) changes.

However, the noise in real images originates from various sources (for example, dark current noise and thermal noise) and is much more sophisticated. Although the noise in RAW sensor data is relatively well understood, in the RGB domain, the post-processing performed between capture and display (such as demosaicking, sharpening, tone mapping and compression) makes the noise model more complex, which makes the image denoising task more challenging.

For example, by taking the in-camera image processing pipeline into account, the channel-independent noise assumption may not hold true. In general, a realistic noise model as well as the in-camera image processing pipeline are important aspects in training CNN-based denoising methods for real photographs.

Traditional single-image denoising algorithms often analytically model properties of images and the noise they are designed to remove. Many methods have been developed using different mathematical tools and models, including partial differential equations, sparse coding and low-rank approximation. Most of these methods rely on very limited human knowledge or assumptions about the image prior, limiting their capability in recovering complex image structures.

Modern denoising methods often employ neural networks to learn a mapping from noisy images to noise-free images. Deep learning is capable of representing complex properties of images and noise, but training these models requires large paired datasets. As a result, most learning-based denoising techniques rely on synthetic training data.

By stacking convolution, batch normalization, ReLU layers and adopting the idea of residual learning, the DnCNN approach, as described in Kai Zhang, Wangmeng Zuo, Yunjin Chen, Deyu Meng, and Lei Zhang, "Beyond a Gaussian Denoiser: Residual Learning of Deep CNN for Image Denoising", IEEE Transactions on Image Processing, 2017, achieves a much higher PSNR index than conventional state-of-the-art approaches. Some complex networks, such as that described in Ying Tai, Jian Yang, Xiaoming Liu, and Chunyan Xu, "Memnet: A persistent memory network for image restoration", CVPR, 2017, have also been proposed.

The Generative Adversarial network (GAN) approach to denoising comprises a generator and a discriminator module commonly optimized with alternating gradient descent methods. The generator samples z from a prior distribution $p_z$, such as a uniform distribution, and tries to model the target distribution $p_d$. The discriminator D aims to distinguish between the samples generated from the model and the target (ground-truth) distributions.

Conditional GAN (cGAN), as described in Mehdi Mirza and Simon Osindero, "Conditional generative adversarial nets", arXiv preprint arXiv:1411.1784, 2014, extends the formulation by providing the generator with additional labels. The generator G typically takes the form of an encoder-decoder network where the encoder projects the label into a low-dimensional latent subspace and the decoder performs the opposite mapping, i.e. from low-dimensional to high-dimensional subspace. Ifs denotes the conditioning label and y denotes a sample from the target distribution, the adversarial loss is expressed as:

$$\mathcal{L}_{adv}(G,D) = \mathbb{E}_{s,y \sim p_d(s,y)}[\log D(y|s)] + \mathbb{E}_{s \sim p_d(s), z \sim p_z(z)}[\log(1 - D(G,z)|s))] \quad (2)$$

by solving the following min-max problem:

$$\min_{w_G} \max_{w_D} \mathcal{L}_{adv}(G, D) = \min_{w_G} \max_{w_D} \mathbb{E}_{s,y \sim p_d(s,y)}[\log D(y \mid s, w_D)] + \mathbb{E}_{s \sim p_d(s), z \sim p_z(z)}[\log(1 - D(G(s, z \mid w_G) \mid s, w_D))] \quad (3)$$

where $w_G, w_D$ denote the parameters of the generator and the discriminator respectively. To simplify the notation, the dependencies on the parameters and the noise z have been omitted in the description below.

A recent method extending the conditional GAN approach is the Robust Conditional GAN (RoCGAN), as described in G. Chrysos et al., "Robust Conditional Generative Adversarial Networks", ICLR, 2019. FIG. 2 schematically shows a conventional generator according to the RoCGAN approach. In this approach, the generator is augmented with an unsupervised pathway to encourage the outputs of the generator to span the target manifold even in the presence of large amounts of noise. The first pathway 201, referred to as the reg pathway, performs a similar regression (denoising) as its counterpart in cGAN. It accepts a sample from the source domain (noisy image) and maps it to the target domain (clean image). The additional AE pathway 202 works as an autoencoder in the target domain.

In RoCGAN, the AE pathway contributes the following loss term:

$$\mathcal{L}_{AE} = \Sigma_{n=1}^{N} [f_d(y^{(n)}, G^{(AE)}(y^{(n)}))] \qquad (4)$$

where $f_d$ denotes a divergence metric ($\ell_1$ loss), the superscript 'AE' abbreviates modules of the AE pathway, 'G' modules of the reg pathway and $G^{(AE)}(y^{(n)}) = d^{(AE)}(e^{(AE)}(y^{(n)}))$ is the output of the AE pathway.

Despite sharing the weights of the encoders, RoCGAN forces the latent representations of the two pathways to span the same space. To further reduce the distance of the two representations in the latent space, a latent loss term $\mathcal{N}_{lat}$ is used. This term minimizes the distance between the encoders' outputs, i.e. the two representations are spatially close (in the subspace spanned by the encoders).

The latent loss term is given by:

$$\mathcal{N}_{lat} = \Sigma_{n=1}^{N} \| e^{(G)}(s^{(n)}) - e^{(AE)}(y^{(n)}) \| \qquad (5)$$

The feature matching loss enables the network to match the data and the model's distribution faster. The intuition is that to match the high-dimensional distribution of the data with reg pathway, their projections in lower-dimensional spaces are encouraged to be similar.

The feature matching loss is given by:

$$\mathcal{N}_f = \Sigma_{n=1}^{N} \| \pi(G(s^{(n)})) - \pi(y^{(n)}) \| \qquad (6)$$

where $\pi()$ extracts the features from the penultimate layer of the discriminator.

Skip connections can enable deeper layers to capture more abstract representations without the need to memorize all of the information. The lower-level representations are propagated directly to the decoder through the shortcut, which makes it harder to train the longer path, i.e. the network excluding the skip connections. This challenge is implicitly tackled by maximizing the variance captured by the longer path representations. The Decoy loss term that penalizes the correlations in the representations (of a layer) and thus implicitly encourages the representations to capture diverse and useful information is used. This loss may be applied to a single layer or multiple layers in a network, while for the $j^{th}$ layer this loss is defined as:

$$\mathcal{L}_{decov}^{j} = \frac{1}{2}(\|C^j\|_F^2 - \|\text{diag}(C^j)\|_2^2) \qquad (7)$$

where diag( ) computes the diagonal elements of a matrix and $C^j$ is the covariance matrix of the $j^{th}$ layer's representations. The loss is minimized when the covariance matrix is diagonal, i.e. it imposes a cost to minimize the covariance of hidden units without restricting the diagonal elements that include the variance of the hidden representations.

By defining $G(s^{(n)}) = d^{(G)}(e^{(G)}(s^{(n)}))$ as the output of the reg pathway, the final loss function of RoCGAN combines the loss terms of the original cGAN with the additional three terms for the AE pathway:

$$\mathcal{L}_{RoCGAN} = \underbrace{\mathcal{L}_{adv} + \lambda_c \cdot \underbrace{\sum_{n=1}^{N} \|G(s^{(n)}) - y^{(n)}\|}_{content-loss} + \lambda_\pi \cdot \mathcal{L}_f}_{cGAN-loss} + \qquad (8)$$

$$\lambda_{ae} \cdot \mathcal{L}_{AE} + \lambda_l \cdot \mathcal{L}_{lat} + \lambda_d \cdot \sum_j \mathcal{L}_{decov}^{j}$$

where $\lambda_c$, $\lambda_\pi$, $\lambda_{ae}$, $\lambda_l$, and $\lambda_d$ are hyper-parameters to balance the loss terms.

The AE pathway is an unsupervised learning method whose hidden layers contain representations of the input data for compressing (and decompressing) the data while losing as little information as possible. However, even in the presence of skip connections, the AE pathway is not capable of reconstructing all natural scenes and patterns. In other words, the use of one autoencoder to define a nonlinear manifold which can accurately reconstruct image patterns from a variety of real complex objects/scenes is not realistic. As a result, previous methods such as RoCGAN very often hallucinate complex image structures by introducing severe blurry effects or unnatural image patterns/artifacts.

The heavy computation and memory footprint of these methods also hinders their application on hardware constrained devices, such as smartphones or consumer electronic products. In addition, these methods try to exploit image priors to better model the clean image; something which is a very complex problem given the variety of all natural image patterns.

While the prevalence of smartphones makes them a convenient device for photography, their images are typically degraded by higher levels of noise due to the smaller sensors and lenses found in their cameras. This problem has heightened the need for progress in image denoising, particularly in the context of smartphone imagery.

It is therefore desirable to develop an approach to image denoising that overcomes these problems.

SUMMARY OF THE INVENTION

According to a first aspect there is provided an apparatus for denoising an image, the apparatus having a processor configured to receive an input image, implement a trained artificial intelligence model to form an estimate of a noise pattern in the input image and form an output image by subtracting the estimate of the noise pattern from the input image, the model being configured to form the estimate of the noise pattern such that the estimate of the noise pattern is representative of a noise pattern that is characteristic to a specific image sensor type.

The model may be configured to form estimates of noise patterns that are characteristic to each of a plurality of types of image sensors, the apparatus may be configured to receive an indication of the specific image sensor type of an image sensor that captured the input image, the apparatus may be configured to provide that indication as an input to the model, and the model may be configured to generate the estimate of the noise pattern in dependence on the indication. The apparatus may comprise an imaging device having the image sensor that captured the input image, and the apparatus may be configured to generate the input image using the imaging device and to provide the indication of the specific image sensor type as input to the model. Providing an indication of the type of sensor that captured an image to the noise model may result in improved image quality.

The apparatus may comprise an imaging device in which the image sensor is included, and the apparatus may be configured to generate the input image using the imaging device and to provide information indicative of the noise behaviour of the image sensor as input to the model. Providing further information as input to the model, such as the parameters of the noise model for the sensor, may result in improved image quality.

The noise pattern may be non-Gaussian. This may result in improved quality in the denoised image and accommodate more complex noise models which may be needed due to post-processing performed between capture and display, in processes such as demosaicking, sharpening, tone mapping and compression.

The model may be configured to form the estimate of the noise pattern by means of a projection on to a trained noise manifold. Using this approach, meaningful image structures may be better retained through the denoising process, which may enhance the image quality.

According to a second aspect there is provided a method for training a model to perform noise reduction on images, the method comprising: receiving a plurality of training images; receiving a plurality of noise signatures; for each of the plurality of training images: (i) selecting one of the plurality of noise signatures and applying that noise signature to the training image to form a noisy input image; (ii) forming a first noise estimate in the noisy input image by implementing a candidate version of the model on the noisy input image and forming an estimate of the respective training image by subtracting the first noise estimate from the noisy input image; (iii) forming a second noise estimate by implementing the candidate version of the model on the respective training image and the selected noise signature; and (iv) adapting the candidate version of the model in dependence on (a) a difference between the respective training image and the estimate of the respective training image and (b) a difference between the second noise estimate and the selected noise signature. The plurality of training images may comprise a plurality of clean ground truth input images and the plurality of noise signatures may comprise a plurality of real residual images.

The forming step (ii) may be performed in a first pathway and the forming step (iii) may be performed in a second pathway. Augmenting the generator of an image processor with the second pathway promotes the generator to remove from the noisy input the residual noise which spans the target image signal-dependent noise manifold.

Each of the first and second pathways may comprise an encoder-decoder network. The weights of the decoders of the first and second pathways may be shared. By sharing the weights of their decoders, this promotes the regression outputs to span the target manifold and not induce arbitrarily large errors.

The first pathway and the second pathway may each be based on a fully convolutional network. This may be a convenient implementation.

The second pathway may implement an unsupervised learning method. The hidden layers of the unsupervised learning method may contain representations of the input data sufficiently powerful for compressing (and decompressing) the data whilst losing as little information as possible.

The first pathway may comprise one or more skip connections. Skip connections, which connect the intermediate layers of the encoder with the corresponding intermediate layers of the decoder, may enforce the network to learn the residual between the features corresponding to the predicted image noise and the actual image noise. This may result in faster convergence.

Each of the plurality of training images and/or input images may be a RAW image or an RGB image. This may allow the method to be used in devices such as smartphones to remove noise from images captured by the cameras of such devices.

The model may be a convolutional neural network. This may be a convenient implementation.

According to a third aspect there is provided a device for training a model to perform noise reduction on images, the device having a processor configured to perform the steps of: receiving a plurality of training images; receiving a plurality of noise signatures; for each of the plurality of training images: (i) selecting one of the plurality of noise signatures and applying that noise signature to the training image to form a noisy input image; (ii) forming a first noise estimate in the noisy input image by implementing a candidate version of the model on the noisy input image and forming an estimate of the respective training image by subtracting the first noise estimate from the noisy input image; (iii) forming a second noise estimate by implementing a candidate version of the model on the respective training image and the selected noise signature; and (iv) adapting the candidate version of the model in dependence on (a) a difference between the respective training image and the estimate of the respective training image and (b) a difference between the second noise estimate and the selected noise signature. The plurality of training images may comprise a plurality of clean ground truth input images and the plurality of noise signatures may comprise a plurality of real residual images.

BRIEF DESCRIPTION OF THE FIGURES

The present invention will now be described by way of example with reference to the accompanying drawings. In the drawings:

FIG. 1(a) shows a noisy image.

FIG. 1(b) shows the improvement of the image quality achieved by applying an image denoising technique to the noisy image of FIG. 1(a).

FIG. 2 schematically illustrates a conventional generator according to the RoCGAN approach described in G. Chrysos et al., "Robust Conditional Generative Adversarial Networks", ICLR, 2019.

FIGS. 10 (a)-(d) shows denoising results compared to results obtained using DnCNN (Z. Kai et al., 2017). FIG. 10(a) shows the noisy RGB input image. FIG. 10(b) shows the denoised image by the DnCNN method. FIG. 10(c) shows the denoised image by the method described herein, and FIG. 10(d) shows the clean ground truth image.

DETAILED DESCRIPTION OF THE INVENTION

Described herein is a method for image denoising based on explicitly understanding the structure of the noise added by an image sensor to the images captured by the sensor. The method directly reconstructs the image noise. Using this approach, meaningful image structures may be better retained through the denoising process, which may enhance the image quality.

The goal of the method is to perform image denoising using reconstructed image noise that spans the target image signal-dependent noise manifold. The input to the image processor may comprise RAW image data or RGB image data. The image processor comprises a generator and a discriminator module each comprising a convolutional neural network (CNN), which may be optimized with alternating gradient descent methods. The generator samples from a prior distribution (for example, a uniform distribution), and aims to model the target distribution. The discriminator aims to distinguish between the samples generated from the model and the target (ground-truth) distributions.

Figure 3:
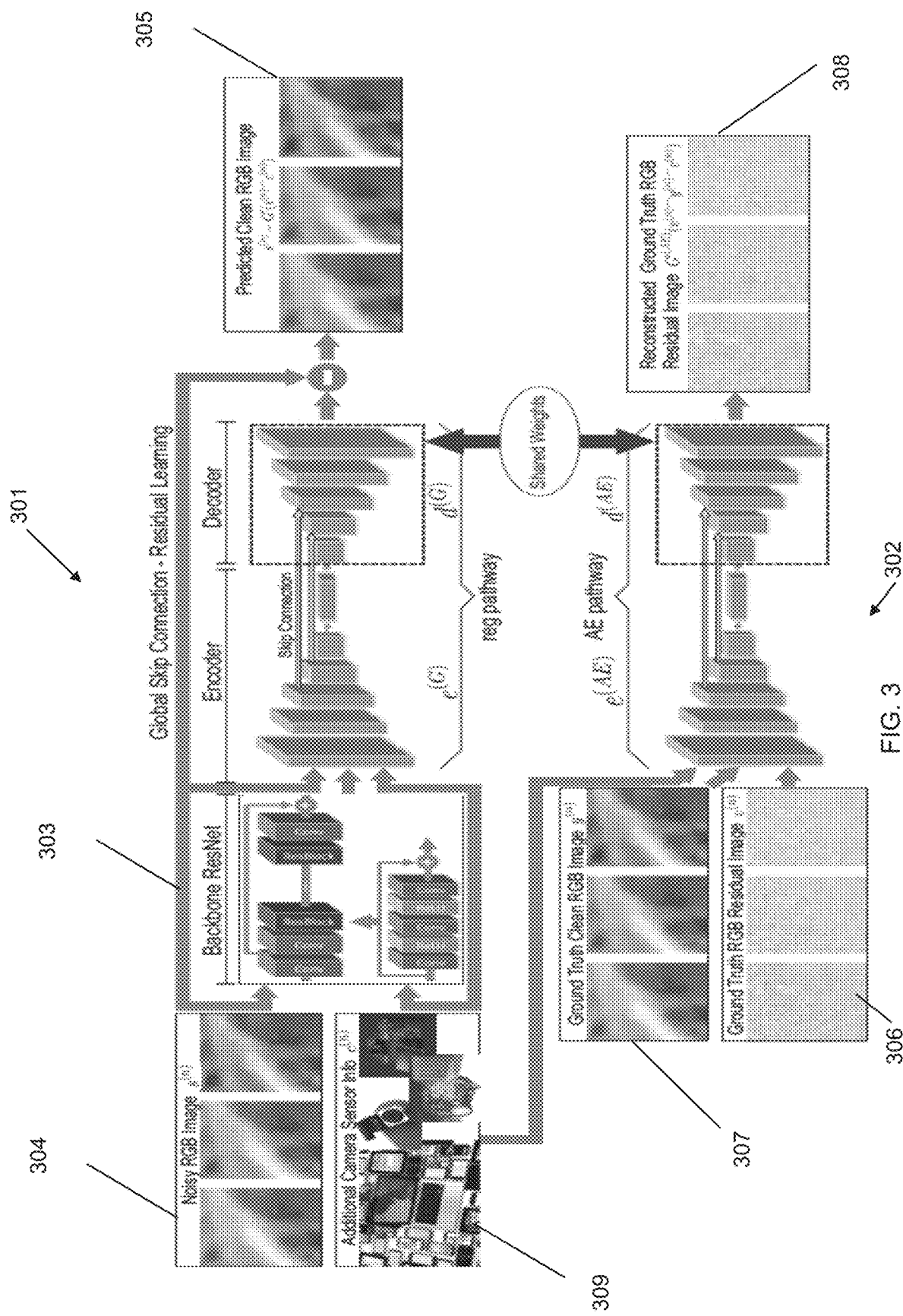
FIG. 3 shows a schematic illustration of a generator for use in image denoising in the RGB domain.

A preferred embodiment of the CNN design of the generator is schematically illustrated in FIG. 3. FIG. 3 schematically illustrates the inputs and outputs of the pathways of the generator during training of the model. An adversarial neural network is used based on an encoder-decoder generator with two pathway modules and shared decoder parameters. As illustrated schematically in FIG. 3, the generator typically takes the form of an encoder-decoder network where the encoder projects the label into a low-dimensional latent subspace and the decoder performs the opposite mapping, i.e. from low-dimensional to high-dimensional subspace.

The generator comprises a first pathway 301 (herein referred to as the reg pathway 301) and a second pathway 302 (herein referred to as the AE pathway 302). Both the reg pathway 301 and AE pathway 302 are based on deep learning and may, for example, apply a CNN to process the image. A CNN learns a collection of filters, which are applied to the image through convolution. The convolution is designed to be spatially invariant, meaning the convolution has the same effect when applied to any location in the image.

Figure 4:
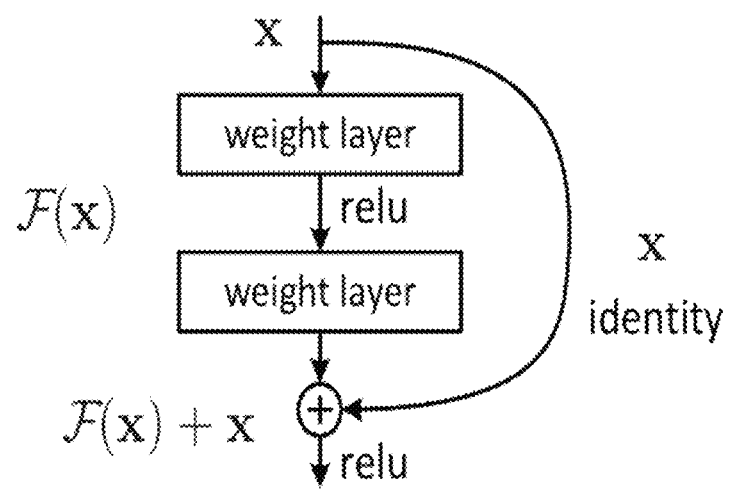
FIG. 4 schematically illustrates the building block used in a backbone residual network (ResNet) (K. He, X. Zhang, S. Ren, and J. Sun, "Deep residual learning for image recognition", IEEE Conference on Computer Vision and Pattern Recognition (CVPR), pages 770-778, 2016).

Noising is a challenging process to be reversed by the few convolutional layers of the encoder in the reg pathway, especially in the object-independent scenario. To that end, a backbone network, shown at 303, may be used prior to the reg pathway to extract complex feature representations useful to preserve later on the low and high image frequencies. The backbone network 303 may be a residual network (ResNet), as described in K. He, X. Zhang, S. Ren, and J. Sun, "Deep residual learning for image recognition", IEEE Conference on Computer Vision and Pattern Recognition (CVPR), pages 770-778, 2016, created by stacking building blocks as schematically depicted in FIG. 4. Therefore, the input to the reg pathway 301 may be features extracted from the image to be denoised (for example, in the form of a tensor) rather than the image itself.

During training, the network learns the convolutional filter weights. This can be done using a plurality of training pairs comprising a reference clean RGB input image y, 307, which is used as a ground truth (GT) image (i.e. a training image), and a noisy RGB input image s=y+v, 304, where v is the real (GT) residual image 306, which is a noise signature of the image. The noise signatures v, 306, may be generated by a noise model and applied to the respective ground truth input image y, 307, to give the noisy input image s, 304. Initially, the convolutional filters are set to random values. The noisy RGB input image s, 304, is input into the network, and the network regresses a denoised output image 305 (i.e. the predicted clean image). The difference between the regressed denoised output image 305 and the clean GT image 307 forms an error, which is then back-propagated through the network from the output to the input though gradients. The weights of the network are then updated to reduce the error. The training process iterates using a large collection of training images until the network weights converge.

During training, the AE pathway 302 learns how to reconstruct the image noise (the residual image). The second pathway 302 receives the ground truth residual image (noise signature) v, 306, and the clean ground truth image y, 307, and outputs a reconstructed ground truth residual image, G'(s), 308. The input to the AE pathway 302 is the GT residual image (i.e. the noise signature) v, 306, concatenated with the clean ground truth input image y, 307 (i.e. the input is v⊙y). In that way, the task of the AE pathway 302 is not to learn the underlying structure of a huge variety of complex image patterns, but to learn how image structures are affected by the presence of structured noise. By sharing the weights of their decoders, the generator adopts the residual learning strategy to remove from the noisy observation that image information which spans the image noise manifold.

As described above, the reg pathway 301 takes the noisy RGB image s, 304, as input which is then processed by a backbone ResNet model 303 followed by a Unet, as described in Ronneberger, Olaf et al., "U-Net: Convolutional Networks for Biomedical Image Segmentation," Medical Image Computing and Computer-Assisted Intervention (MICCAI), Springer, LNCS, Vol. 9351: 234-241, 2015. The output of the pathway 301 is the predicted residual image (noise) G'(s) (i.e. an estimate of the noise in the image) which is then removed from the noisy input image 304 to obtain the denoised output image 305, which is a predicted clean RGB image.

The reg pathway 301 implicitly removes the latent clean image with the operations in the hidden layers. Because of this, the unsupervised AE pathway 302 works as an autoencoder in the domain of the real residual image 306 (the noise signature of the training image), v=s−y.

Once the network is trained, during inference only the reg pathway 301 is applied to a noisy RGB input image to produce its denoised clean version. At inference, the first pathway can predict residual noise in an input image captured by an imaging device and subtracts the predicted residual noise from the input image to obtain the denoised output image.

The first pathway 301 therefore acts as generator, based on residual learning, and performs regression. The generator is augmented with the second pathway 302 which, during training, promotes the generator to remove from the noisy input image the residual noise which spans the target image signal-dependent noise manifold.

The present method directly reconstructs the image noise. Rather than directly outputting a denoised image, the first pathway 301 in the method described herein is designed to predict the ground-truth residual image G'(s), i.e., a first noise estimate which is the difference between the noisy observation s and the clean (ground-truth) image y.

In a further embodiment, this residual learning can benefit from any conditional information related to the specific image sensor type and/or the noise characteristics of the sensor, c, schematically shown at 309 in FIG. 3. During training, this can be explicitly given to the generator in concatenation (denoted as ⊙) with s to get its output G'(s⊙c). In other words, the proposed conditional reg pathway 301 implicitly removes the latent clean image with the operations in the hidden layers. Because of this, the unsupervised AE pathway 302 works as a conditional autoencoder in the domain of v. The input to this pathway is v in concatenation with y and c. In this way, by explicitly giving y as additional input, the task of the AE pathway 302 is not to learn the underlying structure of a huge variety of complex image patterns, but to learn how image structures are affected by the presence of structured noise. By sharing the weights of their decoders, the generator adopts the residual learning strategy to remove from the noisy observation that image information which spans the image noise manifold.

In the case of image denoising in RGB domain, the images are 3-channel based tensors. On the other hand, in RAW domain, each pixel in a conventional image sensor (linear Bayer sensor readings) is covered by a single red, green, or blue color filter, arranged in a Bayer pattern, such as R-G-G-B. Also, the information that c represents varies. In the case that the noise model of the image sensor of the imaging device is known, c could contain the two noise parameters a, and as (both same for each pixel). In the case of more than one imaging device sensor, c may also contain one hot vector per pixel defining the imaging device ID (for example, camera ID) used to take each picture.

The model may therefore be configured to form estimates of noise patterns that are characteristic to each of a plurality of types of image sensors. The apparatus implementing the model may be configured to receive an indication of the specific image sensor type of an image sensor that captured the input image, and the apparatus can provide that indication as an input to the model. The model can then generate the estimate of the noise pattern in dependence on the indication. The model may further be provided with an indication of the specific sensor type used to generate the input image or may be provided with information indicative of the noise behaviour of the image sensor as input. This may assist the model to form estimates of noise patterns that are characteristic to specific types of image sensors.

Figure 5:
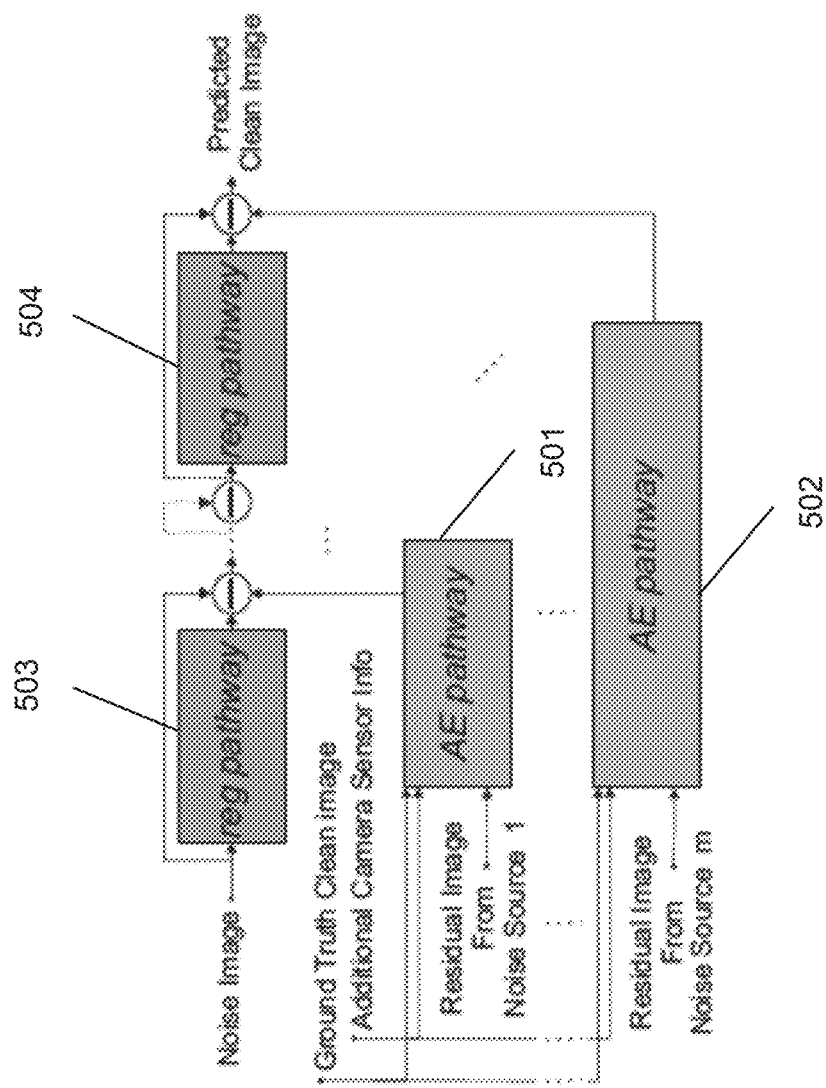
FIG. 5 schematically illustrates the use of more than one AE pathway in the case of camera multi-source image noise.

FIG. 5 schematically illustrates an example of the use of more than one AE pathway 501, 502, in the generator which can be used in the case of multi-source image noise. Reg pathways are shown at 503 and 504. Therefore, the generator of the image processor may comprise at least one further pathway having the same structure as the primary AE pathway. In this case, each AE pathway 501, 502 can be responsible for removing noise information that comes from a specific noise source.

Figure 6:
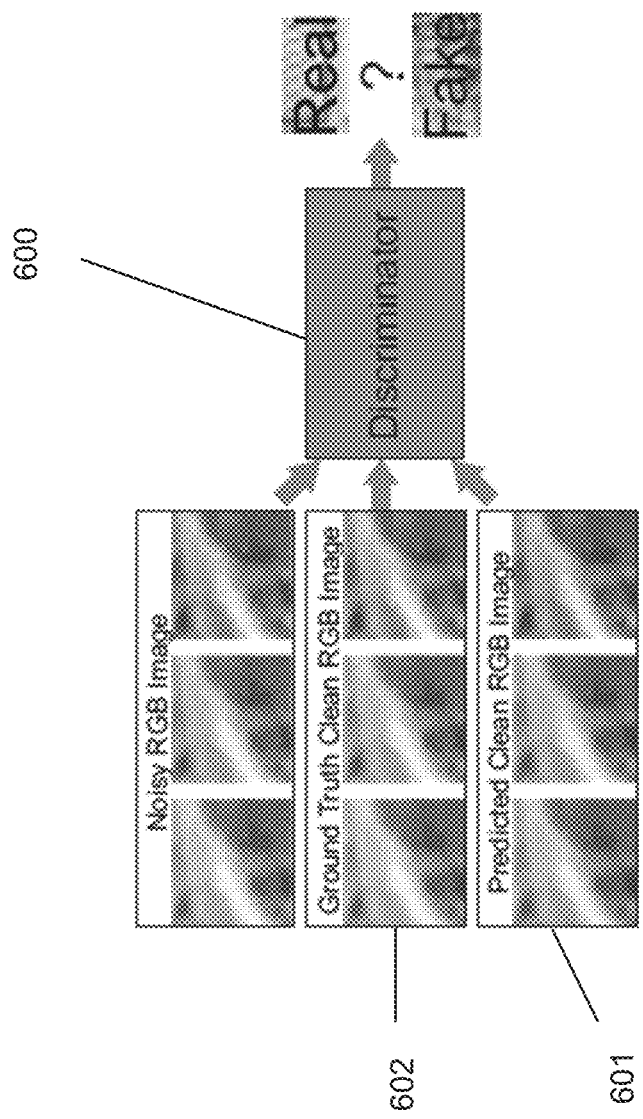
FIG. 6 schematically illustrates an example of a discriminator.

An example of the discriminator 600 of the image processor is schematically illustrated in FIG. 6. The discriminator 600 accepts the predicted clean image, s–G'(s) (or s–G'(s⊙c)), 601, along with y, 602, as input.

In the method described herein, the content loss comprises two terms that compute the per-pixel difference between the predicted clean image, and the clean (ground-truth) image. The two terms are i) the $\ell_1$ loss between the ground-truth image and the output of the generator, ii) the $\ell_1$ of their gradients, mathematically expressed as:

$$\mathcal{L}_c{}'=\lambda_c\|(s^{(n)}-G'(s^{(n)}\odot c^{(n)}))-y^{(n)}\|_{\ell_1}+\lambda_{cg}\|\nabla(s^{(n)}-G'(s^{(n)}\odot c^{(n)}))-\nabla y^{(n)}\|_{\ell_1} \quad (9)$$

The loss term for the unsupervised (AE) module is:

$$\mathcal{L}_{AE}{}'=\Sigma_{n=1}^{N}[f_d(v^{(n)},G'^{(AE)}(v^{(n)}\odot y^{(n)}\odot c^{(n)}))] \quad (10)$$

where $G'^{(AE)}(v^{(n)}\odot y^{(n)}\odot c^{(n)})=d^{(AE)}(e^{(AE)}(v^{(n)}\odot y^{(n)}\odot c^{(n)}))$ is the output of the AE pathway and $f_d$ represents an $\ell_2$ loss due to the auto-encode in the domain of the residual image.

The latent loss term is given by:

$$\mathcal{L}_{lat}{}'=\Sigma_{n=1}^{N}\|e^{(G)}(s^{(n)}\odot c^{(n)})-e^{(AE)}(v^{(n)}\odot y^{(n)}\odot c^{(n)})\| \quad (11)$$

The feature matching loss is given by:

$$\mathcal{L}_f{}'=\Sigma_{n=1}^{N}\|\pi(s^{(n)}-G'(s^{(n)}\odot c^{(n)}))-\pi(y^{(n)})\| \quad (12)$$

The final loss function is given by:

$$\mathcal{L}_{final}=\mathcal{L}_{adv}+\mathcal{L}_c{}'+\lambda_{\pi}\mathcal{L}_f{}'+\Delta_{ac}\cdot\mathcal{L}_{AE}{}'+\lambda_l\mathcal{L}_{lat}{}'+\lambda_d\Sigma_j\mathcal{L}_{decov}{}^j \quad (13)$$

where $\lambda_c$, $\lambda_{cg}$, $\lambda_\pi$, $\lambda_{ae}$, $\lambda_l$, and $\lambda_d$ are hyper-parameters to balance the loss terms.

In the examples described herein, the reg pathways 301, 503, 504 and the AE pathways 302, 501, 502 comprise "fully convolutional" networks.

Figure 7:
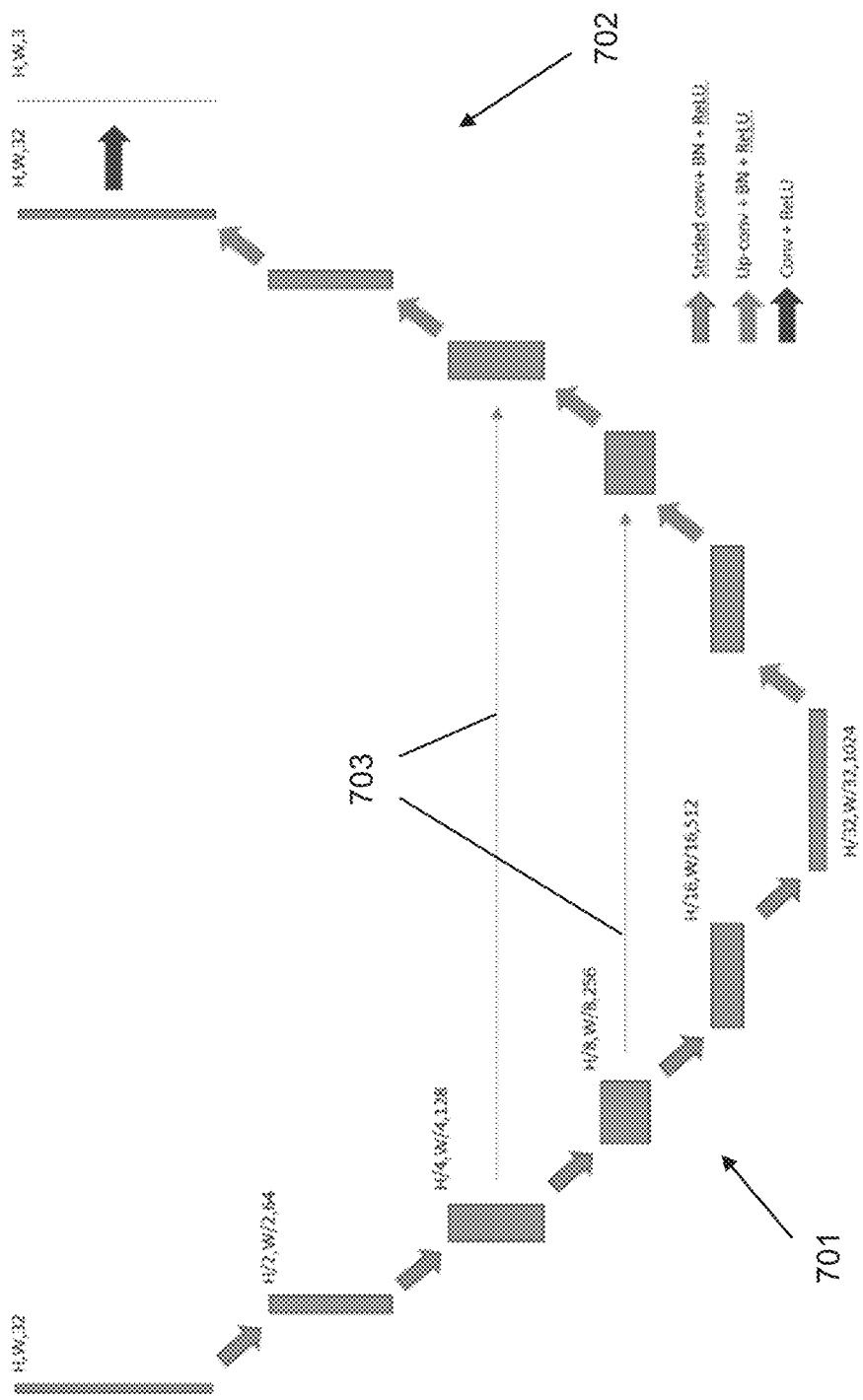
FIG. 7 schematically illustrates an example of the Unet architecture used in the method described herein.

FIG. 7 schematically illustrates an example of the Unet architecture which can be used in the approach described herein. The Unet uses an encoder-decoder architecture with two lateral Unet style skip connections. The encoder part of the network is shown generally at 701, the decoder at 702 and the skip connections are shown at 703. These skip connections 703, which connect the intermediate layers of the encoder with the corresponding intermediate layers of the decoder 702, enforce the network to learn the residual between the features corresponding to the predicted image noise and the actual image noise. This has the impact of faster convergence as empirically detected. The AE pathway takes as input the real (groundtruth) residual image which is then processed by a Unet similar to that one in the reg pathway. The output is the reconstruction of the real residual image.

The encoder part of the network, shown generally at 701, processes the noisy RGB input with six consecutive layers. Each layer applies to its input a strided convolutional with 3×3 convolutional filters (together with a ReLU activation function and batch normalization). The strided convolution increases the number of filters (i.e. channels) by a factor of two while at the same time it reduces the spatial image resolution by a factor of two (i.e. from H, W, C to H/2, W/2, C). The image is processed at multiple scales and the network adapts to different frequency content. This produces output channels that capture features inherent in the data and relevant to the RGB image denoising task.

The decoder part of the network, shown generally at 702, processes the output of the encoder with five consecutive layers of a Transposed Convolution operation with 3×3 convolutional filters (together with a ReLU activation function and batch normalization). The Transposed Convolution is an upsampling layer which increases the spatial resolution by a factor of two in each dimension (width and height) and decreases the number of filters by a factor of two.

The skip connections, schematically shown at 703 in FIG. 7, may enable deeper layers to capture more abstract representations without the need to memorize all of the information. The lower level representations are propagated directly to the decoder through the shortcut. In the case of layers with a Unet style skip connection, the input to each of these decoder layers is a concatenation of i) the high resolution features from the encoding part related to the same spatial resolution and ii) the output of the previous decoding layer (i.e. spatially upsampled features). The subsequent convolution learns to assemble a more precise output based on the concatenated input. The input to each of the rest of the decoder layers is only the output of the previous decoding layer.

Figure 8:
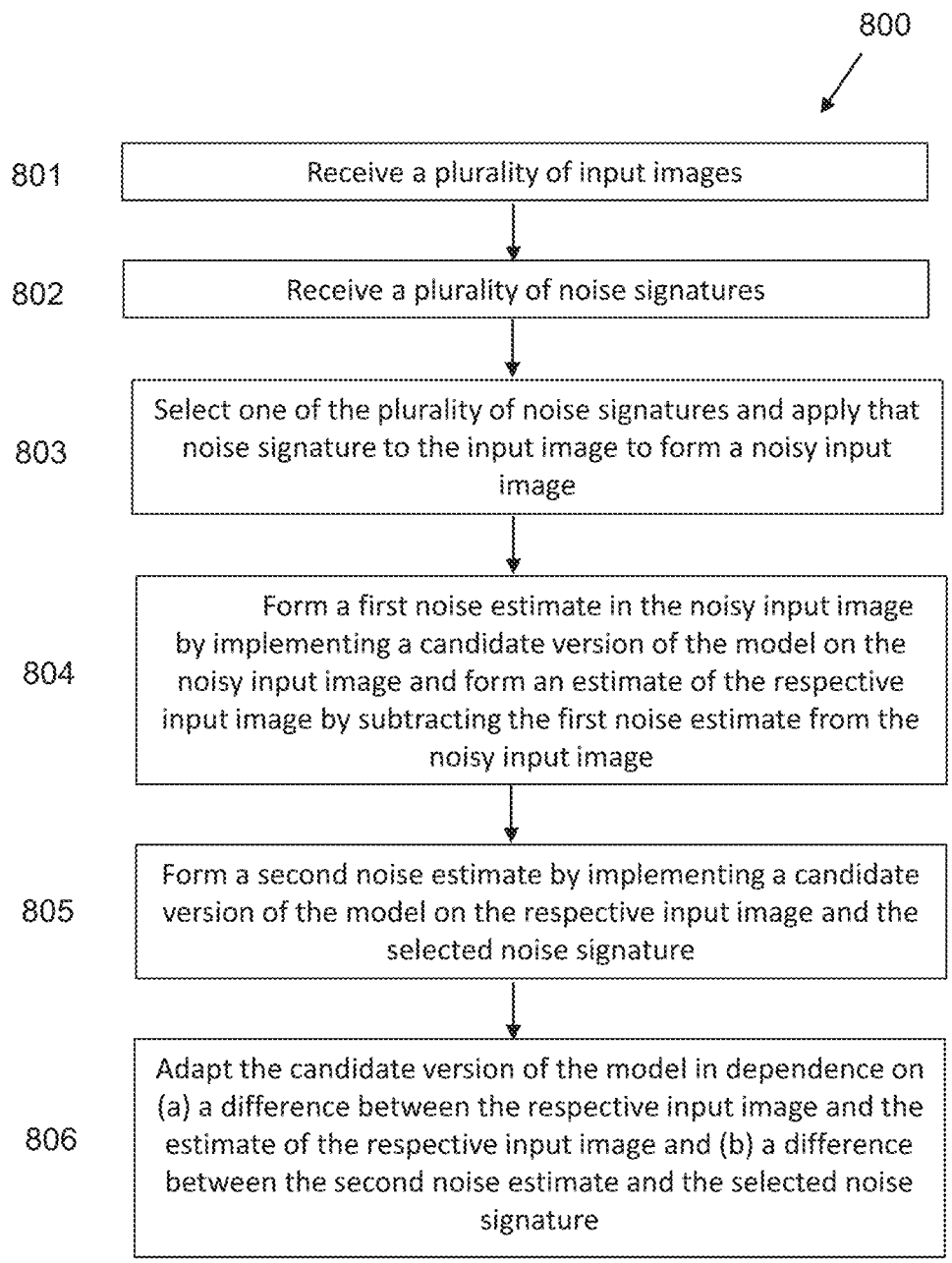
FIG. 8 represents a workflow of a method for training a model to perform noise reduction on images.

FIG. 8 represents a workflow of a method 800 for training a model to perform noise reduction on images. At step 801, the method comprises receiving a plurality of training images 307. At step 802, the method comprises receiving a plurality of noise signatures 306. Then, for each of the plurality of training images 307 the method comprises performing the following steps. At step 803 the method comprises selecting one of the plurality of noise signatures 306 and applying that noise signature 306 to the training image 307 to form a noisy input image 304. At step 804, the method comprises forming a first noise estimate in the noisy input image 304 by implementing a candidate version of the model on the noisy input image 304 and forming an estimate 305 of the respective training image 307 by subtracting the first noise estimate from the noisy input image 304. At step 805, the method comprises forming a second noise estimate 308 by implementing the candidate version of the model on the respective training image 307 and the selected noise signature 306. At step 806, the method comprises adapting the candidate version of the model in dependence on (a) a difference between the respective training image 307 and the estimate 305 of the respective training image and (b) a difference between the second noise estimate 308 and the selected noise signature 306.

Figure 9:
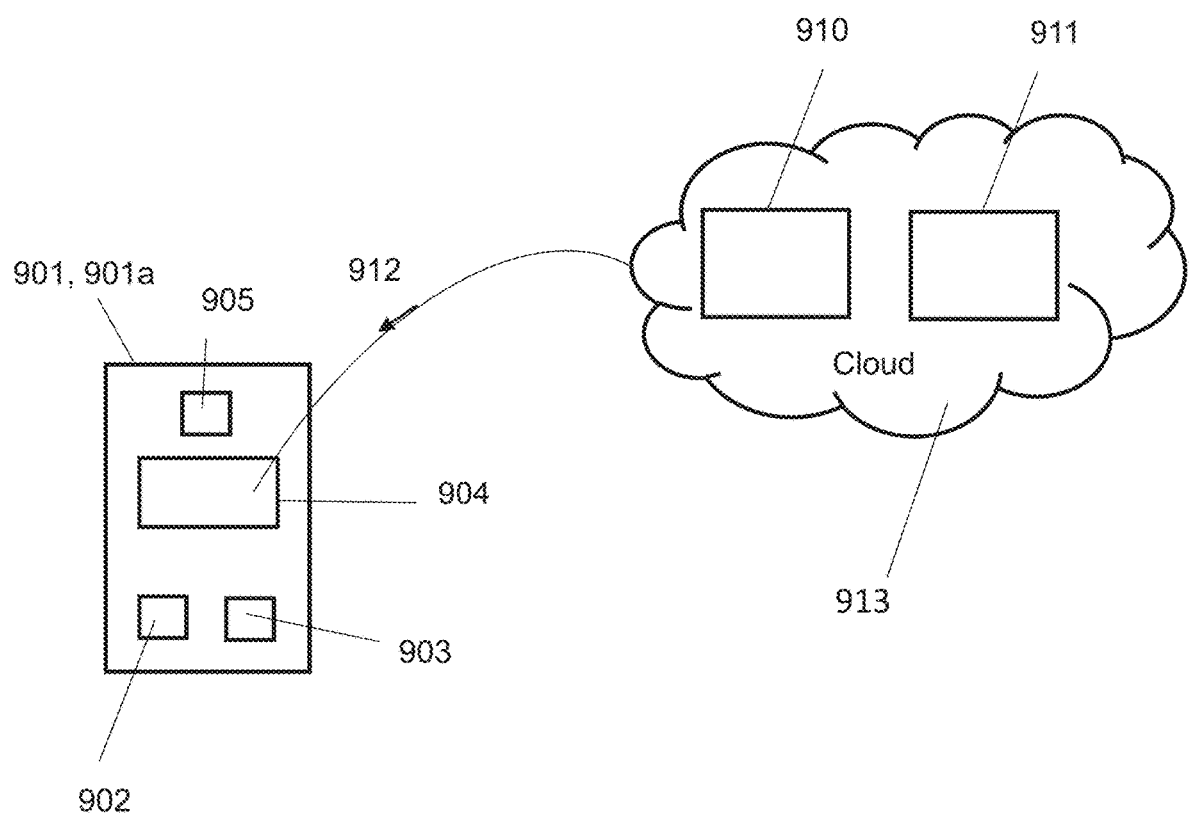
FIG. 9 schematically illustrates an example of an imaging device configured to implement the image processor described herein.

FIG. 9 schematically illustrates an example of an apparatus 901 including an imaging device 901*a* that can implement the method 800 described above. According to some embodiments, the imaging device 901*a* may be a camera. The imaging device 901*a* is connected to a communications network. The imaging device 901*a* comprises an image sensor 902. The imaging device 901*a* also comprises a memory 903, a processor 904 and a transceiver 905. The memory stores in non-transient form code that can be run by the processor 904. In some implementations, that code may include a data-driven model as described above. The model may include code that is directly executable by the processor and/or parameters such as neural network weightings which are not directly executable instructions but serve to configure other executable code that is stored in the memory 903. The transceiver 905 may be capable of transmitting and receiving data over either or both of wired and wireless communication channels. For example, it may support Ethernet, IEEE 802.11B and/or a cellular protocol such as 4G or 5G.

Such an imaging device 901*a* typically includes some onboard processing capability. This could be provided by the processor 904. The processor 904 could also be used for the essential functions of the imaging device 901*a*.

The transceiver 905 is capable of communicating over a network with other entities 910, 911. Those entities may be physically remote from the imaging device 901*a*. The network may be a publicly accessible network such as the internet. The entities 910, 911 may be based in the cloud 913. Entity 910 is a computing entity. Entity 911 is a command and control entity. These entities are logical entities. In practice they may each be provided by one or more physical devices such as servers and datastores, and the functions of two or more of the entities may be provided by a single physical device. Each physical device implementing an entity comprises a processor 904 and a memory. The devices may also comprise a transceiver for transmitting and receiving data to and from the transceiver 905 of the imaging device 901*a*. The memory stores in a non-transient way code that is executable by the processor 904 to implement the respective entity in the manner described herein.

The command and control entity 911 may train the model. This is typically a computationally intensive task, even though the resulting model may be efficiently described, so it may be efficient for the development of the model to be performed in the cloud 913, where it can be anticipated that significant energy and computing resource is available. It can be anticipated that this is more efficient than forming such a model at a typical imaging device.

In one implementation, once the model has been developed in the cloud 913, the command and control entity can automatically form a corresponding model and cause it to be transmitted to the relevant imaging device 901*a*. In this example, denoising is performed at the imaging device 901*a* by processor 904.

In another possible implementation, an image may be captured by the image sensor 902 and the image data may be sent by the transceiver 905 to the cloud 913 for processing. The resulting target image could then be sent back to the imaging device 901*a*, as shown at 912 in FIG. 9.

Therefore, the method may be deployed in multiple ways; for example in the cloud 913, on the device, or alternatively in dedicated hardware. As indicated above, the cloud facility could perform training to develop new models or refine existing ones. Depending on the compute capability near to the data corpus, the training could either be undertaken close to the source data, or could be undertaken in the cloud 913, e.g. using an inference engine.

At inference, the imaging device 901*a* may implement, on the input image, the trained model so as to form a noise estimate in the image and to subtract the noise estimate from the input image to form a reduced-noise output image. At inference, the imaging device 901*a* may perform a method comprising the following steps: receiving an input image (i.e. a noisy image); implementing a trained artificial intelligence model to form an estimate of a noise pattern in the input image; and forming an output image by subtracting the estimate of the noise pattern from the input image, wherein the model is configured to form the estimate of the noise pattern such that the estimate of the noise pattern is representative of a noise pattern that is characteristic to a specific image sensor type.

The methods described herein have many advantages.

For the AE pathway 302, the reconstruction of the true image noise is an easier task compared to the reconstruction of the clean image and only required consideration of the structure of the residual image. This property renders the method an object-independent image denoiser and helps the denoiser to avoid image over-smoothing, which is very important for any image denoiser.

The unsupervised AE pathway 302 enables the utilization of all the samples in the domain of the residual image even in the absence of a corresponding noisy input samples. For example, in the case of a well-defined image noise source, a large amount of different residual image realizations could be generated and used to train that pathway.

Using the present method, it is easier to adapt an existing trained model to a new imaging device sensor (domain transfer). To do so, the AE pathway 302 can be retrained while the reg pathway 301 needs only to be fine-tuned using a small number of paired training samples obtained using the new sensor.

There are drawbacks of the previous RoCGAN method related to the use (or not) of skip connections. In the absence of skip connections, RoCGAN performs well only in the case of object-depended image denoising (i.e. face denoising). This restricts its use, since the need of having different models for different objects makes it not suitable for digital devices with limited resources, such as smartphones, where the run-time performance is of importance.

Therefore, a device implementing the method can learn how to transform noisy images by only looking at the structure of the residual image. In this way, the task of image denoising is simplified. Furthermore, explicitly learning a low dimensional manifold for a noise source gives the ability not only to better remove that noise from the image but, in the case of many different kind of noise sources, it is possible to combine all of them in the same pipeline. The device can form an estimate of a noise pattern that is representative to a specific image sensor type and can effectively remove noise where the noise pattern is non-Gaussian.

When the original mapping is more like an identity mapping, the residual mapping may be optimized more easily. Note that the ground-truth clean image is much more like the noisy one than the output of the reg pathway (especially when the noise level is low). Thus, the original mapping would be closer to an identity mapping than the output of the reg pathway, and the residual learning formulation is more suitable for image denoising.

FIGS. 10(a)-(d) show an example of denoising results and a comparison with the result from DnCNN, as described in Kai Zhang, Wangmeng Zuo, Yunjin Chen, Deyu Meng, and Lei Zhang, "Beyond a Gaussian Denoiser: Residual Learning of Deep CNN for Image Denoising", IEEE Transactions on Image Processing, 26(7):3142-3155, 2017. FIG. 10(a) shows the noisy RGB input image, FIG. 10(b) shows the denoised output image given by the DnCNN method, FIG. 10(c) shows the denoised output image given by the method described herein and FIG. 10(d) shows the clean ground truth image. It can be seen that in this implementation, the present method preserves the high frequency image details.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A computer-implemented method for training a model to perform noise reduction on images, the method comprising:
   receiving a plurality of training images;
   receiving a plurality of noise signatures; and
   for each of the plurality of training images:
   (i) selecting one of the plurality of noise signatures and applying that noise signature to the respective training image to form a noisy input image;
   (ii) forming a first noise estimate in the noisy input image by implementing a candidate version of the model on the noisy input image and forming an estimate of the respective training image by subtracting the first noise estimate from the noisy input image;
   (iii) forming a second noise estimate by implementing the candidate version of the model on the respective training image and the selected noise signature; and
   (iv) adapting the candidate version of the model in dependence on (a) a difference between the respective training image and the estimate of the respective training image and (b) a difference between the second noise estimate and the selected noise signature.

2. The computer-implemented method as claimed in claim 1, wherein the forming step (ii) is performed in a first pathway and the forming step (iii) is performed in a second pathway.

3. The computer-implemented method as claimed in claim 2, wherein each of the first and second pathways comprises an encoder-decoder network.

4. The computer-implemented method as claimed in claim 3, wherein a plurality of weights of a plurality of decoders of the first and second pathways are shared.

5. The computer-implemented method as claimed in claim 2, wherein the first pathway and the second pathway are each based on a fully convolutional network.

6. The computer-implemented method as claimed in claim 2, wherein the second pathway implements an unsupervised learning method.

7. The computer-implemented method as claimed in claim 2, wherein the first pathway comprises one or more skip connections.

8. The computer-implemented method as claimed in claim 1, wherein each of the plurality of training images is a RAW image or an RGB image.

9. The computer-implemented method as claimed in claim 1, wherein the model is a convolutional neural network.

10. A device for training a model to perform noise reduction on images, comprising:
    one or more processors; and
    a non-transitory computer readable medium storing a program to be executed by the one or more processors, wherein the program comprises instructions that cause the device to perform operations comprising:
    receiving a plurality of training images;
    receiving a plurality of noise signatures; and
    for each of the plurality of training images:
    (i) selecting one of the plurality of noise signatures and applying that noise signature to the respective training image to form a noisy input image;
    (ii) forming a first noise estimate in the noisy input image by implementing a candidate version of the model on the noisy input image and forming an estimate of the respective training image by subtracting the first noise estimate from the noisy input image;
    (iii) forming a second noise estimate by implementing the candidate version of the model on the respective training image and the selected noise signature; and
    (iv) adapting the candidate version of the model in dependence on (a) a difference between the respective training image and the estimate of the respective training image and (b) a difference between the second noise estimate and the selected noise signature.

11. The device as claimed in claim 10, wherein the forming step (ii) is performed in a first pathway and the forming step (iii) is performed in a second pathway.

12. The device as claimed in claim 11, wherein each of the first and second pathways comprises an encoder-decoder network.

13. The device as claimed in claim 12, wherein a plurality of weights of a plurality of decoders of the first and second pathways are shared.

14. The device as claimed in claim 11, wherein the first pathway and the second pathway are each based on a fully convolutional network.

* * * * *